US012654462B2

(12) United States Patent
Joboji et al.

(10) Patent No.: US 12,654,462 B2
(45) Date of Patent: Jun. 16, 2026

(54) INK JET PRINTER AND INK SUPPLY METHOD OF INK JET PRINTER

(71) Applicant: BROTHER KOGYO KABUSHIKI KAISHA, Nagoya (JP)

(72) Inventors: Rie Joboji, Nagoya (JP); Yukari Kokubo, Nagoya (JP); Atsushi Miwa, Anjo (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 215 days.

(21) Appl. No.: 17/731,826

(22) Filed: Apr. 28, 2022

(65) Prior Publication Data

US 2022/0250391 A1 Aug. 11, 2022

Related U.S. Application Data

(63) Continuation of application No. PCT/JP2020/039863, filed on Oct. 23, 2020.

(30) Foreign Application Priority Data

Oct. 29, 2019 (JP) ................................ 2019-196638
Mar. 6, 2020 (JP) ................................ 2020- 038365

(51) Int. Cl.
*B41J 2/175* (2006.01)
*B41J 2/045* (2006.01)

(52) U.S. Cl.
CPC ....... *B41J 2/17596* (2013.01); *B41J 2/04501* (2013.01); *B41J 2/17503* (2013.01)

(58) Field of Classification Search
None
See application file for complete search history.

(56) References Cited

U.S. PATENT DOCUMENTS 5,801,736 A 9/1998 Ikkatai et al.
6,364,473 B1 * 4/2002 Liu ...................... B41J 2/17506 347/85
7,328,854 B2 * 2/2008 Nakamura .............. F16K 25/04 347/92
8,608,298 B2 * 12/2013 Kanome .............. B41J 2/17596 347/85

(Continued)

FOREIGN PATENT DOCUMENTS

JP H8-132640 A 5/1996
JP 2001-038920 A 2/2001

(Continued)

OTHER PUBLICATIONS

Japanese Reasons for Refusal dated Aug. 8, 2023 from related JP 2020-038365 together with an English language translation.

(Continued)

*Primary Examiner* — Alejandro Valencia
(74) *Attorney, Agent, or Firm* — Scully, Scott, Murphy & Presser, P.C.

(57) ABSTRACT

There is provided an ink jet printer including: an installation case in which a first tank communicating with an atmosphere is to be installed; a second tank; a head communicating with the second tank; a first channel having one end to be communicated with the first tank installed in the installation case and the other end communicating with the second tank; a second channel having one end communicating with an upper part inside the second tank and the other end to be communicated with the first tank installed in the installation case; and a pump which is disposed in the second channel and which is configured to move a fluid at least from the one end of the second channel to the other end of the second channel.

12 Claims, 10 Drawing Sheets

(56) References Cited

U.S. PATENT DOCUMENTS

| | | | | |
|---|---|---|---|---|
| 9,421,780 | B2 * | 8/2016 | Nishiyama | B41J 2/18 |
| 9,669,631 | B2 * | 6/2017 | Takahashi | B41J 2/21 |
| 2010/0289856 | A1 | 11/2010 | Yamamoto et al. | |
| 2011/0007105 | A1 * | 1/2011 | Kuribayashi | B41J 2/17566 347/6 |
| 2013/0100213 | A1 | 4/2013 | Kuribayashi | |
| 2014/0362148 | A1 * | 12/2014 | Ishizawa | B41J 29/13 347/86 |
| 2018/0250946 | A1 | 9/2018 | Nakamura et al. | |
| 2022/0169033 | A1 * | 6/2022 | Goto | B41J 2/04563 |

FOREIGN PATENT DOCUMENTS

| | | | |
|---|---|---|---|
| JP | 2002-248783 | A | 9/2002 |
| JP | 2003-182109 | A | 7/2003 |
| JP | 2009-126044 | A | 6/2009 |
| JP | 2013-099925 | A | 5/2013 |
| JP | 2015-100988 | A | 6/2015 |
| JP | 2018-144305 | A | 9/2018 |
| JP | 2019-064088 | A | 4/2019 |

OTHER PUBLICATIONS

Extended European Search Report dated Oct. 26, 2023 issued in related EP 20 88 1524.1.

International Search Report of International Patent Application No. PCT/JP2020/039863 dated Dec. 28, 2020 together with English language translation.

International Preliminary Report on Patentability and Written Opinion from PCT/JP2020/039863 dated May 12, 2022 together with English language translation.

* cited by examiner

INK JET PRINTER AND INK SUPPLY METHOD OF INK JET PRINTER

CROSS REFERENCE TO RELATED APPLICATIONS

This application is a Continuation Application of International Application No. PCT/JP2020/039863 which was filed on Oct. 23, 2020 claiming the conventional priority of Japanese patent Applications No. 2019-196638 filed on Oct. 29, 2019 and No. 2020-038365 filed on Mar. 6, 2020. The disclosures of Japanese patent Applications No. 2019-196638 and 2020-038365 and International Application No. PCT/JP2020/039863 are incorporated herein by reference in their entirety.

BACKGROUND

The present disclosure relates to an ink jet printer that performs printing on a medium by discharging ink from a head, and relates to a method of supplying ink in the ink jet printer.

Conventionally, there is known an ink jet printer including an ink supply unit, and a head unit which is connected to the ink supply unit by an ink supply channel. The ink supply unit is provided with a first tank, a second tank, and a pump. Moreover, the head unit is provided with an ink jet head, a third tank, and a pump.

SUMMARY

According to a first aspect of the present disclosure, there is provided an ink jet printer including an installation case, a second tank, a head, a first channel, a second channel and a pump.

A first tank communicating with an atmosphere is to be installed in the installation case.

The head communicates with the second tank.

The first channel has one end to be communicated with the first tank installed in the installation case and the other end communicating with the second tank.

The second channel has one end communicating with an upper part inside the second tank and the other end to be communicated with the first tank installed in the installation case.

The pump is disposed in the second channel and is configured to move a fluid at least from the one end of the second channel to the other end of the second channel.

According to a second aspect of the present disclosure, there is provided a method of supplying ink in an ink jet printer.

The ink jet printer includes: an installation case, a second tank, a head, a first channel, a second channel, a pump, and a sensor.

A first tank communicating with an atmosphere is to be installed in the installation case.

The second tank is different from the first tank.

The head communicates with the second tank.

The first channel has one end to be communicated with the first tank and the other end communicating with the second tank.

The second channel has one end communicating with an upper part inside the second tank and the other end to be communicated with the first tank.

The pump is disposed in the second channel.

The sensor is configured to output a first signal in a case that a position of a liquid surface of an ink in the second tank is lower than a first position and output a second signal in a case that the position of the liquid surface of the ink in the second tank is higher than a second position higher than the first position.

The method comprises, in a case that the first signal is outputted from the sensor, moving the ink in the first tank installed in the installation case to the second tank via the first channel by driving the pump so as to move air in the second tank into the first tank installed in the installation case via the second channel.

In a case that the position of the liquid surface of the ink in the second tank is higher than the second position but the second signal is not outputted from the sensor, the driving of the pump is not stopped so that the ink in the second tank is moved into the first tank installed in the installation case via the second channel.

BRIEF DESCRIPTION OF THE DRAWINGS

FIG. 4A depicts a state that the solenoid valve is closed. FIG. 4B depicts a state that the solenoid valve is opened.

DETAILED DESCRIPTION

Figure 1A:
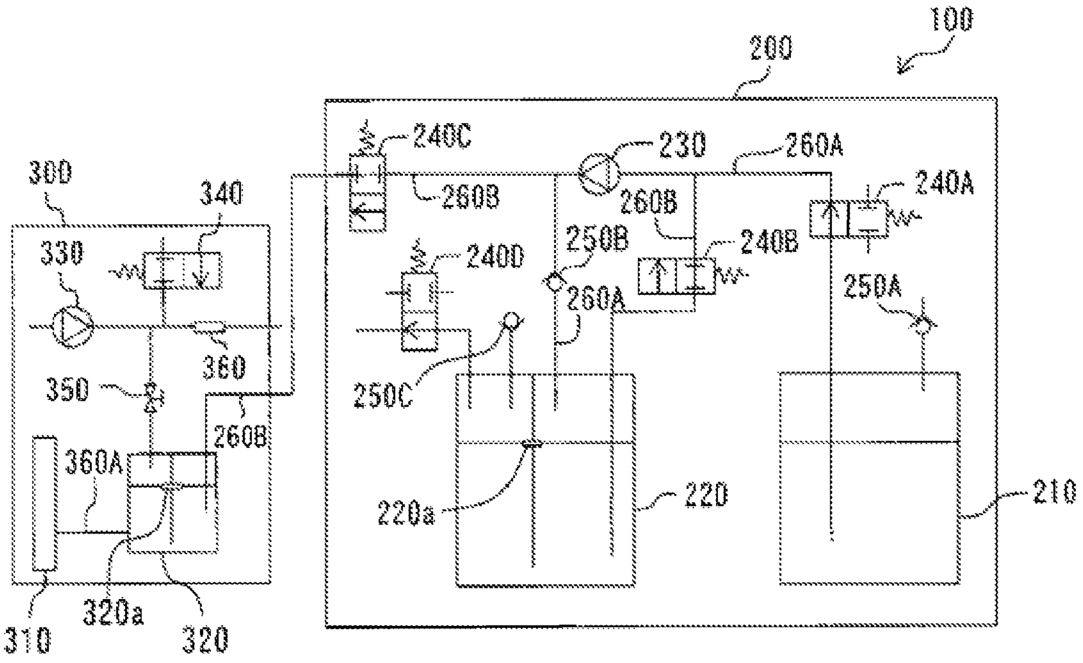
FIG. 1A is a schematic view depicting an ink supply system in a conventional ink jet printer, and depicts an opened/closed state of each valve when ink is supplied from a first tank to a second tank.
Figure 1B:
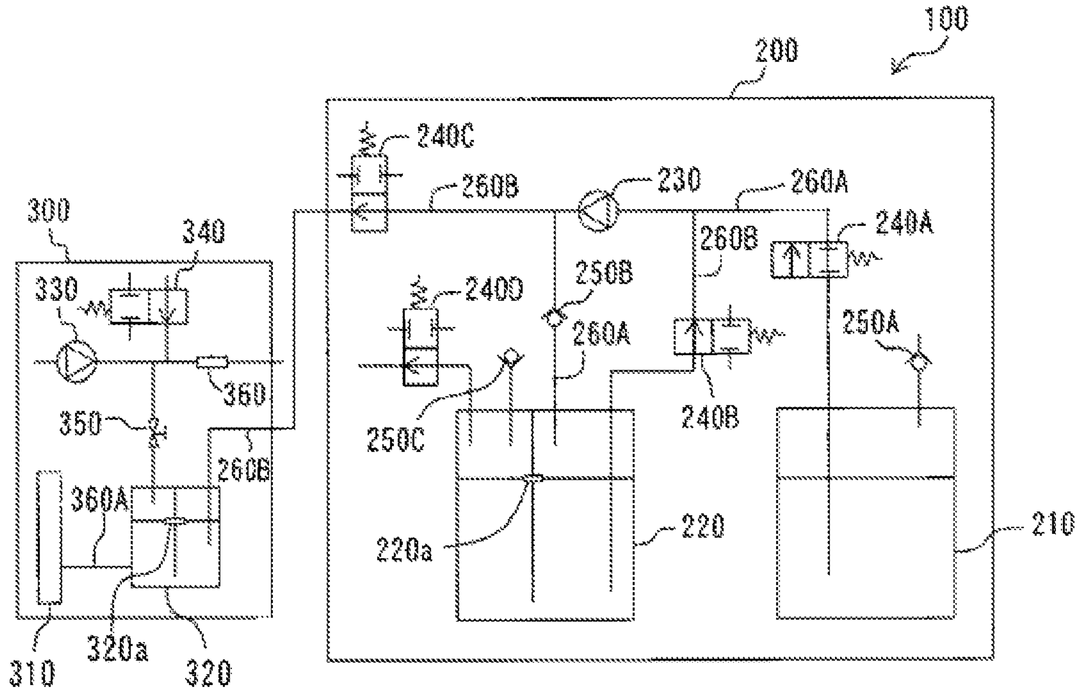
FIG. 1B is a schematic view depicting the ink supply system in the conventional ink jet printer, and depicts an opened/closed state of each valve when ink is supplied from the second tank to a third tank.
Figure 1C:
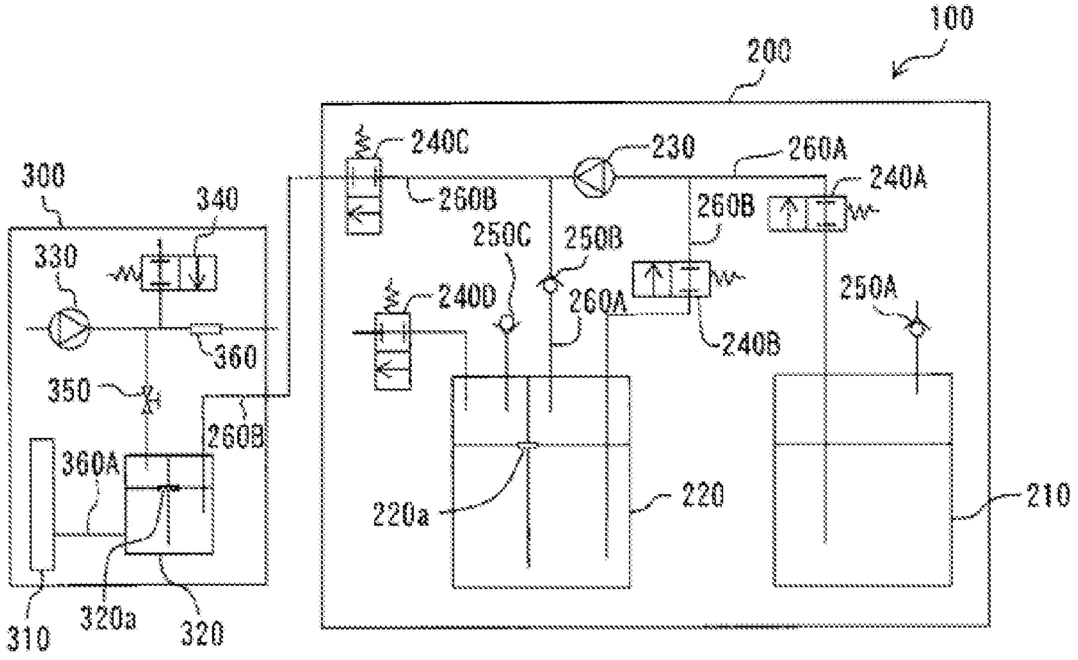
FIG. 1C is a schematic view depicting the ink supply system in the conventional ink jet printer, and depicts an opened/closed state of each valve when ink is supplied from the third tank to an ink jet head.

As depicted in FIGS. 1A to 1C, a conventional ink jet printer 100 includes: an ink supply unit 200; and a head unit 300 which is connected to the ink supply unit 200 by an ink channel. The ink supply unit 200 is provided with a first tank 210, a second tank 220, and a pump 230. Moreover, the head unit 300 is provided with an ink jet head 310, a third tank 320, and a pump 330.

Whereas the first tank 210 is fitted in an attachable/detachable manner to the ink supply unit 200, the second tank 220 is fixedly secured to the ink supply unit 200. The third tank 320 is fixedly secured to the head unit 300. The first tank 210 and second tank 220 communicate by a first channel 260A, and the second tank 220 and third tank 320 communicate by a second channel 260B. Moreover, the pump 230 is commonly provided to the first channel 260A and the second channel 260B.

Furthermore, the first channel 260A is provided with a solenoid valve 240A and a check valve 250B, and the second channel 260B is provided with a solenoid valve 240B and a solenoid valve 240C. Moreover, the first tank 210 is provided with a check valve 250A, and the second tank 220 is provided with a solenoid valve 240D and a check valve 250C. Furthermore, the second tank 220 has its inside provided with a float sensor 220*a* for detecting an amount of ink stored in the second tank 220.

In the head unit 300, the third tank 320 and the ink jet head 310 communicate by a third channel 360A. The third tank 320 is provided with a manually-operated valve 350, and each of the pump 330, a solenoid valve 340, and a restrictor 360 is connected to the manually-operated valve 350. Note that the manually-operated valve 350 is normally open. Furthermore, the third tank 320 has its inside provided with a float sensor 320*a* for detecting an amount of ink stored in the third tank 320.

In the ink supply unit 200, when ink is supplied from the first tank 210 to the second tank 220, the pump 230 of the ink supply unit 200 is driven in a state that the solenoid valves 240A, 240D are opened and the solenoid valves 240B, 240C are closed, as depicted in FIG. 1A. As a result, ink in the first tank 210 flows along the first channel 260A to be supplied to the second tank 220.

When ink is supplied from the second tank 220 of the ink supply unit 200 to the third tank 320 of the head unit 300, the pump 230 of the ink supply unit 200 is driven in a state that the solenoid valves 240B, 240C, 240D are opened and the solenoid valve 240A are closed, as depicted in FIG. 1B. As a result, ink in the second tank 220 flows along the second channel 260B to be supplied to the third tank 320. Note that at this time, the third tank 320 is opened to the atmosphere via the manually-operated valve 350 and the restrictor 360.

Moreover, in the head unit 300, when ink is forcibly supplied from the third tank 320 to the ink jet head 310 for maintenance of the ink jet head 310, the pump 330 of the head unit 300 is driven in a state that the solenoid valves 240A-240D of the ink supply unit 200 and the solenoid valve 340 of the head unit 300 are closed, as depicted in FIG. 1C. As a result, ink in the third tank 320 flows along the third channel 360A to be supplied to the ink jet head 310.

However, in the ink jet printer 100 having the above-described configuration, sometimes, when ink is supplied from the first tank 210 to the second tank 220, an ink amount in the second tank 220 cannot be accurately detected due to the likes of a malfunction of the float sensor 220*a* in the second tank 220. In this case, there has been a possibility that the pump 230 will continue to be driven even after an upper limit value that ink in the second tank 220 is able to be stored has been exceeded, and that ink will thereby overflow from the second tank 220.

Moreover, the second tank 220 is provided with the solenoid valve 240D for opening to the atmosphere. There has been a possibility that if, for example, ink adheres to an air filter fitted to a communicating hole with the atmosphere of the solenoid valve 240D, then when ink is supplied from the first tank 210 to the second tank 220, a large pressure will be generated in the second tank 220, and a lid of the second tank 220 will come off. There has thus been a need for the second tank 220 to be provided with the check valve 250C which is opened at a comparatively low pressure (about 2 psi, for example).

The present disclosure has an object of providing an ink jet printer that, in a configuration where ink is supplied from a first tank to a second tank by a pump, can prevent ink from overflowing from the second tank and make it difficult for pressure in the second tank to rise, even when the pump has continued to be driven due to the likes of a malfunction of a float sensor in the second tank.

In aspects of the present disclosure, the ink is supplied from the first tank to the inside of the second tank that has attained a negative pressure due to drive of the pump. However, sometimes, due to some kind of malfunction, the pump will continue to be driven even after an ink amount in the second tank has reached an upper limit. Even in such a case, ink in the second tank will be returned to the first tank via the second channel. As a result, ink can be prevented from overflowing from the second tank.

An ink jet printer according to an embodiment of the present disclosure will be described below with reference to FIGS. 2 to 6.

Figure 2:
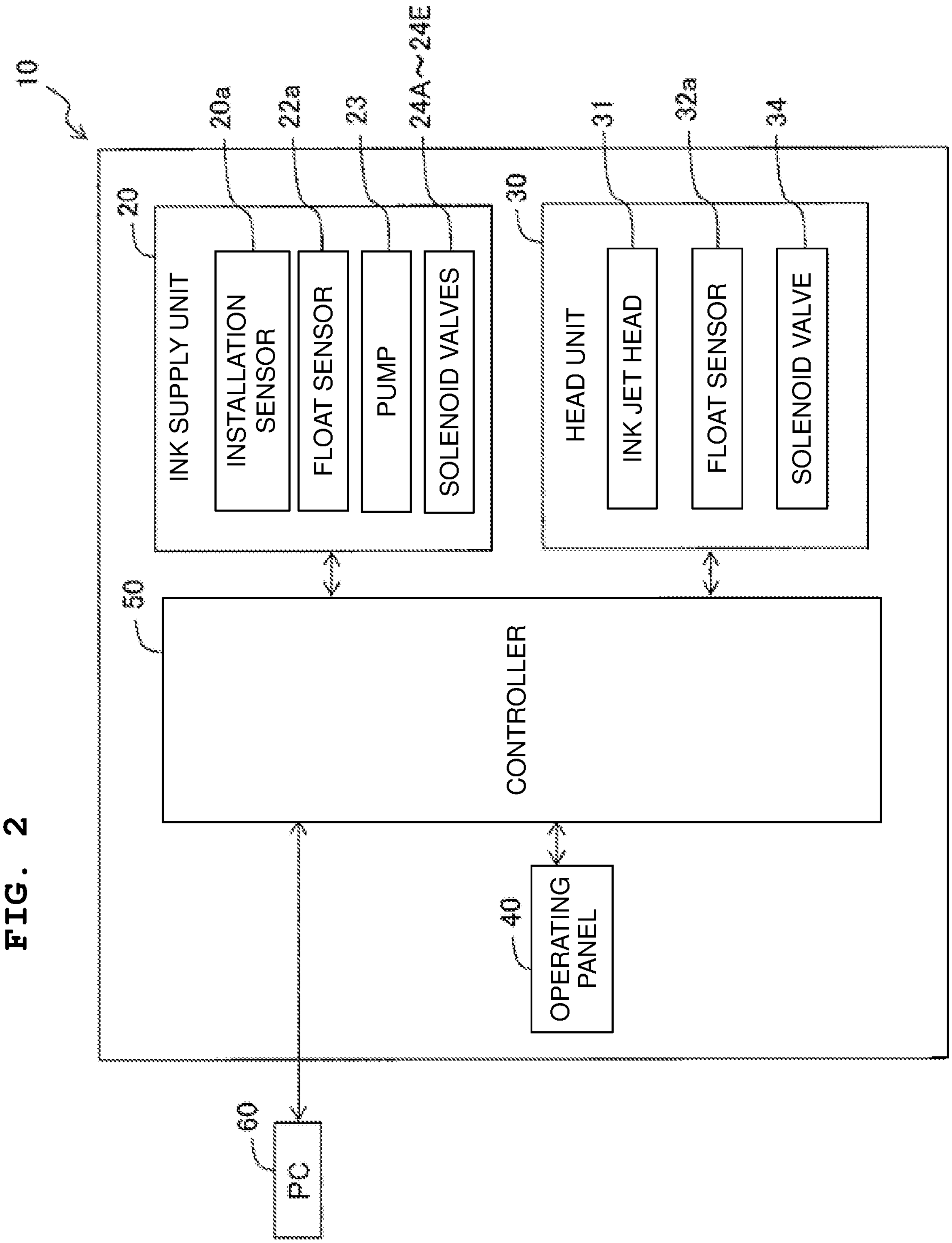
FIG. 2 is a block diagram schematically depicting electrical connection of a controller, an ink supply unit, a head unit, an operating panel, and an external device.

As depicted in FIG. 2, an ink jet printer 10 mainly includes an ink supply unit 20, a head unit (head) 30, an operating panel 40, and a controller 50.

The ink supply unit 20 is provided with a pump 23, an installation sensor 20*a*, a float sensor 22*a*, and solenoid valves 24A-24E, which are electrically connected to the controller 50. Moreover, the head unit 30 is provided with an ink jet head 31, a float sensor 32*a*, and a solenoid valve 34, which are electrically connected to the controller 50. Furthermore, the operating panel 40 acting as an input/output interface with a user is electrically connected to the controller 50. As the ink jet head 31, there may be employed for example a so-called piezo-type ink jet head that includes: a plurality of nozzles; a plurality of channels respectively communicating with the plurality of nozzles; and a piezoelectric actuator that applies a discharge pressure to ink in the plurality of channels.

The controller 50 includes the likes of a CPU (Central Processing Unit), a ROM (Read Only Memory), a RAM (Random Access Memory), and an ASIC (Application Specific Integrated Circuit) including various kinds of control circuits. The controller 50 executes various processing by means of the CPU and ASIC in accordance with a program stored in the ROM. For example, the controller 50 controls the likes of the ink supply unit 20 and head unit 30 to execute print processing to print an image or the like on a medium, based on a print job received from a PC 60 acting as an external device. Note that although an example has been given where the controller 50 performs print processing by the CPU and ASIC, the present disclosure is not limited to this, and the controller 50 may be realized by any hardware configuration. For example, processing may be performed by the CPU alone or the ASIC alone. Moreover, the controller 50 may be realized allotting functions to two or more CPUs or two or more ASICs.

Next, an ink supply system of the ink jet printer 10 according to the embodiment of the present disclosure will be described with reference to FIGS. 3A to 3E.

Figure 3A:
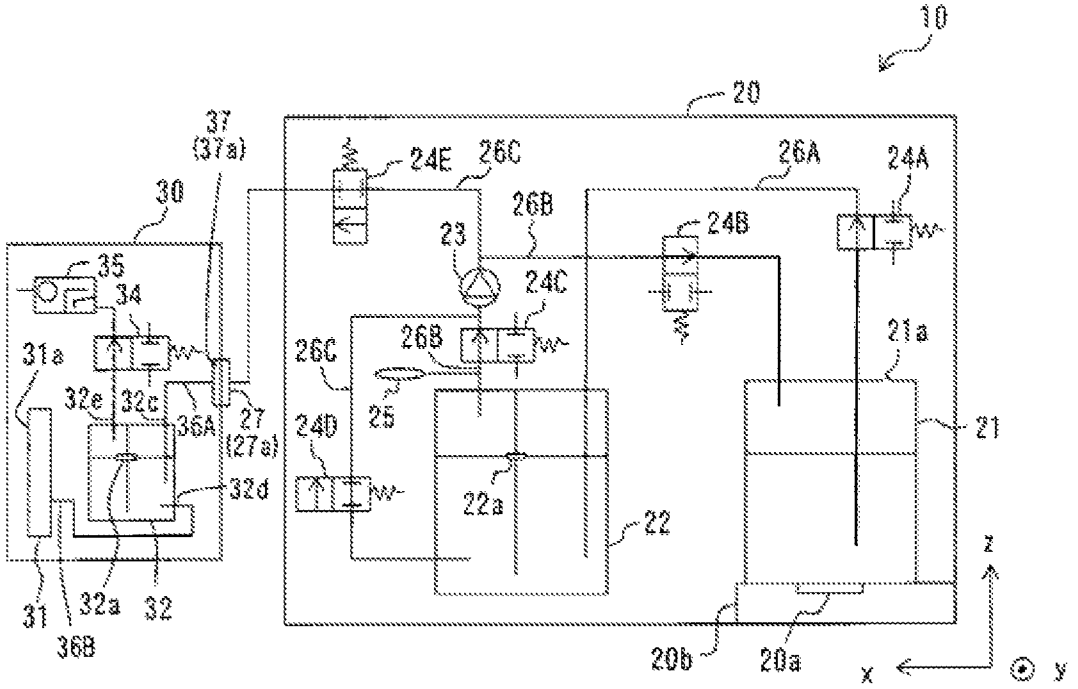
FIG. 3A is a schematic view depicting an ink supply system in an ink jet printer, and depicts an opened/closed state of each valve when ink is supplied from a first tank to a second tank.

As depicted in FIG. 3A, the ink supply unit 20 is provided with the installation sensor 20*a*, an installation case 20*b*, a second tank 22, and the pump 23. Moreover, a first tank 21 is installed in an attachable/detachable manner in the installation case 20*b*. Moreover, the head unit 30 is provided with the ink jet head 31 and a third tank 32.

As mentioned above, the first tank 21 is installed in an attachable/detachable manner in the installation case 20*b* of the ink supply unit 20. The installation sensor 20*a*, which is provided in the installation case 20*b*, outputs a signal that depends on an installation state with respect to the installation case 20*b* of the first tank 21. In the present embodiment, there is employed as the installation sensor 20*a* an RFID reader capable of reading an IC tag fitted to an outer surface of the first tank 21. However, the present disclosure is not limited to this. The installation sensor 20*a* need only be able to detect an installation state with respect to the ink supply unit 20 of the first tank 21, and may employ an optical type sensor, for example. The second tank 22 is fixedly secured to the ink supply unit 20. The third tank 32 is fixedly secured to the head unit 30. The first tank 21 and second tank 22 communicate by a first channel 26A and second channel 26B, and the second tank 22 and third tank 32 communicate by a third channel 26C and fourth channel 36A. Moreover, the pump 23 is commonly provided to the second channel 26B and the third channel 26C. A flexible tube may be used as the first channel 26A, second channel 26B, and third channel 26C, for example.

The first channel 26A is provided with the solenoid valve 24A (an example of a fourth valve), and the second channel 26B is provided with the solenoid valve 24B (an example of a third valve) and the solenoid valve 24C (an example of a first valve). In the second channel 26B, the pump 23 is disposed between the solenoid valve 24B and the solenoid valve 24C. Moreover, the second channel 26B has a pouch 25 provided therein between its end portion on a second tank 22 side and the solenoid valve 24C. When pressure in the second tank 22 has risen due to a change in ambient temperature, the pouch 25 expands, whereby the risen pressure is absorbed. The third channel 26C is provided with the solenoid valve 24D (an example of a second valve), the solenoid valve 24E (an example of a fifth valve), and a first joint 27. In the third channel 26C, the pump 23 is disposed between the solenoid valve 24D and the solenoid valve 24E. The first joint 27, which is couplable with a second joint 37 provided at an end portion of the fourth channel 36A of the head unit 30, is provided in the third channel 26C at an end portion on an opposite side to the tank 22 of said third channel 26C. The first joint 27 is provided with a valve 27*a* that opens by the first joint 27 being coupled with the second joint 37, and closes by coupling of the first joint 27 with the second joint 37 being released. Moreover, the second tank 22 has its inside provided with the float sensor 22*a* for detecting an amount of ink stored in the second tank 22.

Figure 4B:
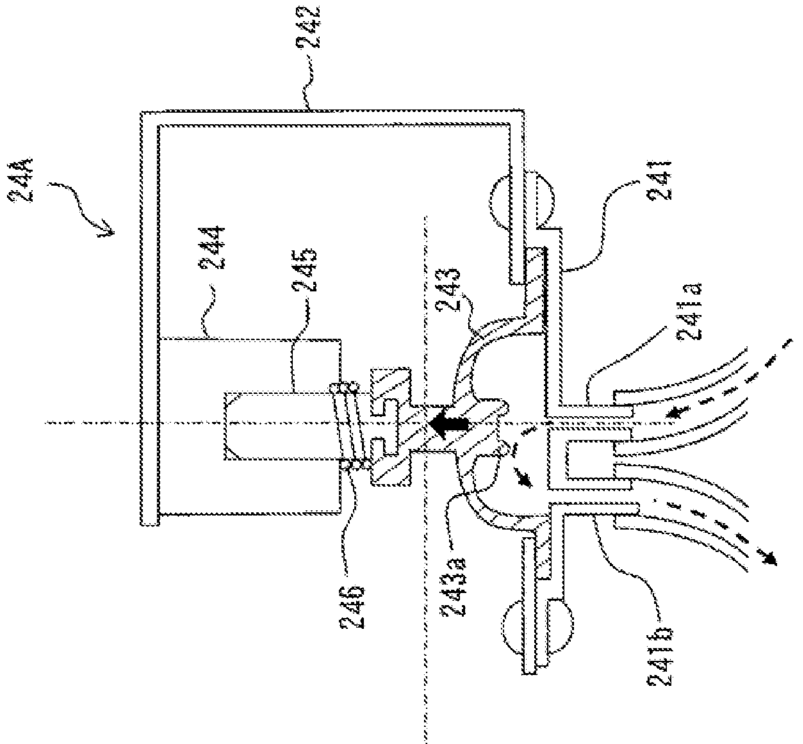
FIGS. 4A and 4B are cross-sectional views for explaining an opening/closing operation of a solenoid valve.
Figure 4A:
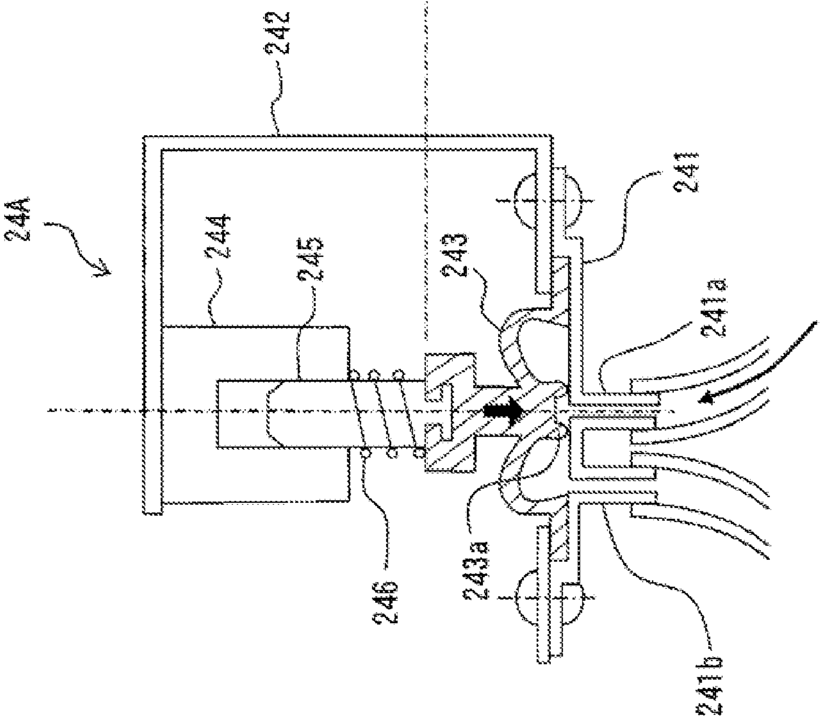

Now, since the solenoid valves 24A-24E in the present embodiment all have the same structure, their structure and operation will be described taking as an example the solenoid valve 24A. As depicted in FIGS. 4A and 4B, the solenoid valve 24A includes a first frame 241, a second frame 242, a diaphragm 243, a coil portion 244, a plunger 245, and a spring 246. Electrification of the coil portion 244 causes the plunger 245 to move, and consequently, as depicted in FIG. 4A, a lip portion 243*a* of the diaphragm 243 seals an inflow port 241*a* provided in the first frame 241. As a result, the solenoid valve 24A attains a closed state. If, in this state, a pressure stronger than a sealing force of the spring 246 is applied to the lip portion 243*a* of the diaphragm 243, then the spring 246 contracts, sealing of the inflow port 241*a* by the lip portion 243*a* of the diaphragm 243 is opened, and a channel from the inflow port 241*a* to an outflow port 241*b* is formed. As a result, the solenoid valve 24A attains an opened state.

In the head unit 30, the third tank 32 is connected to the second joint 37 via the fourth channel 36A. Due to the first joint 27 of the third channel 26C being coupled with the second joint 37, the third channel 26C and fourth channel 36A communicate, and the second tank 22 and third tank 32 communicate. The second joint 37 too is provided with a valve 37*a* that opens by the second joint 37 being coupled with the first joint 27, and closes by coupling of the second joint 37 with the first joint 27 being released. Moreover, the third tank 32 and the ink jet head 31 communicate by a fifth channel 36B. A flexible tube may be used as the fourth channel 36A and fifth channel 36B, for example. Moreover, the third tank 32 is connected with the solenoid valve 34, and the solenoid valve 34 is connected with a channel structure 35 (hereafter, called a labyrinth 35) for communicating the third tank 32 with the atmosphere. Furthermore, the third tank 32 has its inside provided with the float sensor 32*a* for detecting an amount of ink stored in the third tank 32. Note that the solenoid valve 34 has a structure similar to that of the solenoid valves 24A-24E.

Figure 5A:
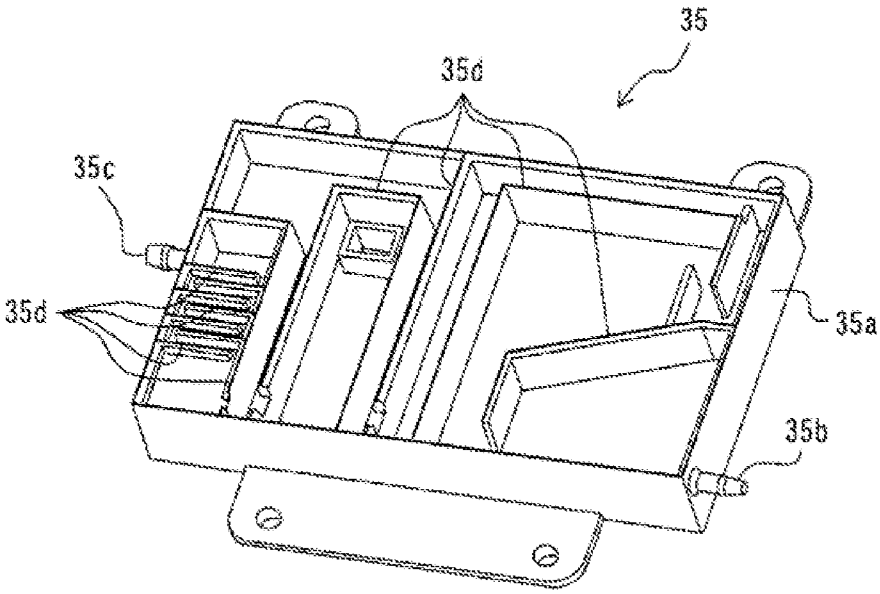
FIG. 5A is a perspective view of a labyrinth seen from a side of one of its side surfaces.
Figure 5B:
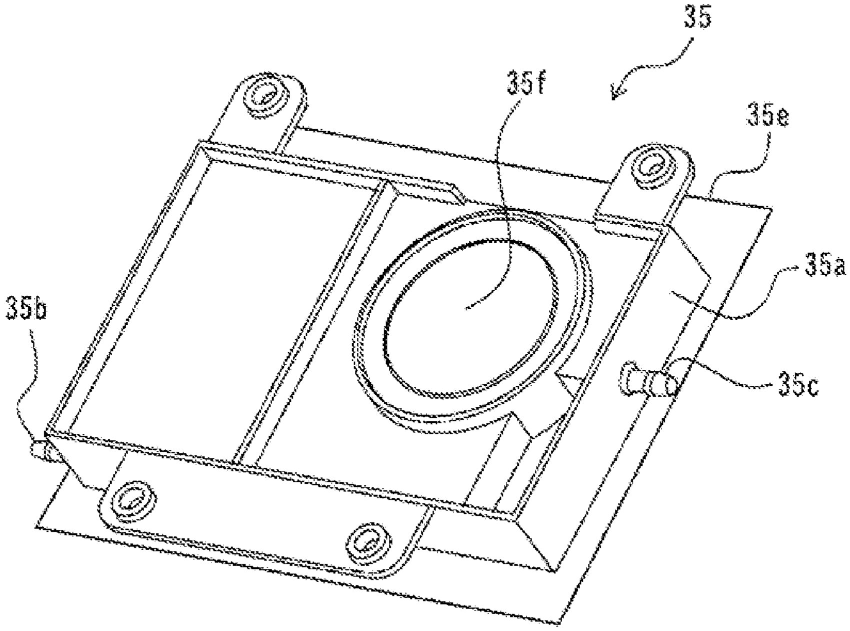
FIG. 5B is a perspective view of the labyrinth seen from a side of the other of its side surfaces.

As depicted in FIGS. 5A and 5B, the labyrinth 35, which is a channel structure having a substantially rectangular parallelepiped outer shape, includes a frame 35*a*, an inflow port 35*b*, an outflow port 35*c*, a plurality of partition walls 35*d*, a damper film 35*e*, and a semipermeable membrane 35*f*. A surface on one side of the labyrinth 35 is formed by the damper film 35*e*, and an opening of a surface on its other side facing the damper film 35*e* is sealed by the semipermeable membrane 35*f*. Note that in FIG. 5A, illustration of the damper film 35*e* is omitted in order to depict structure inside the labyrinth 35. The semipermeable membrane 35*f* is a porous film (membrane) having minute pores that block passage of ink and yet allow passage of air. As depicted in FIG. 5A, the plurality of partition walls 35*d* are intertwined in a complicated manner inside the labyrinth 35 to form a channel from the inflow port 35*b* to the outflow port 35*c*.

In the ink supply unit 20, when ink is supplied from the first tank 21 to the second tank 22, the controller 50 drives the pump 23 in a state that the solenoid valves 24A, 24B, 24C are opened, and the solenoid valves 24D, 24E are closed, as depicted in FIG. 3A. Now, one end of the second channel 26B is disposed in an upper portion inside the second tank 22 at a position corresponding to an upper limit value of an ink amount of the second tank 22. Hence, if the pump 23 is driven in a state of a liquid surface of ink in the second tank 22 not having reached up to the one end of the second channel 26B, then air in the second tank 22 is sucked up, and the inside of the second tank 22 attains a negative pressure. The air that has been sucked up from inside the second tank 22 is delivered to inside the first tank 21 via the solenoid valve 24B, and discharged from an atmosphere communicating hole 21*a* provided in an upper portion of the first tank 21. At the same time, due to the inside of the second tank 22 being at a negative pressure, ink in the first tank 21 flows into the second tank 22 via the first channel 26A. As a result, ink is supplied from the first tank 21 to the second tank 22.

As mentioned above, the inside of the second tank 22 is provided with the float sensor 22*a* for detecting an amount of ink in the second tank 22. When the float sensor 22*a* outputs a signal indicating that the ink amount in the second tank 22 has fallen below a lower limit value, the controller 50 controls the solenoid valves 24A-24E and the pump 23 so that, as mentioned above, ink is supplied from the first tank 21 to the second tank 22. Moreover, when the float sensor 22*a* outputs a signal indicating that the ink amount in the second tank 22 has reached up to the upper limit value, the controller 50 stops drive of the pump 23, whereby supply of ink from the first tank 21 to the second tank 22 is stopped.

Now, it is conceivable that sometimes, due to the likes of a malfunction of the float sensor 22*a*, the signal indicating that the ink amount in the second tank 22 has reached up to the upper limit value is not outputted. In such a case, the controller 50 will not stop drive of the pump 23, hence ink will continue to be supplied to the second tank 22 over the upper limit value, and the one end of the second channel 26B will be immersed in the ink in the second tank 22. Thereupon, the pump 23 will suck up not air inside the second tank 22, but the ink that has been supplied to inside the second tank 22 over the upper limit value. Moreover, the ink that has been sucked up from inside the second tank 22 will be returned to the first tank 21 via the second channel 26B. In other words, in the ink supply unit 20 of the present embodiment, even when the pump has continued to be driven due to the likes of a malfunction of the float sensor 22*a* in the second tank 22, ink that has exceeded the upper limit value of the second tank 22 will be returned to the first tank 21. Hence, ink can be prevented from overflowing from the second tank 22. Furthermore, since ink is supplied from the first tank 21 to the second tank 22 due to the inside of the second tank 22 being imparted with a negative pressure, it is less easy for pressure within the second tank 22 to rise, compared to when ink is drawn up by pump from the first tank 21 to be supplied to the second tank 22. Therefore, damage of the second tank 22 (for example, its lid coming off, or the like) due to pressure in the second tank 22 rising, can be prevented. Moreover, there is no need either for the likes of a check valve for releasing pressure within the second tank 22, to be provided.

Figure 3B:
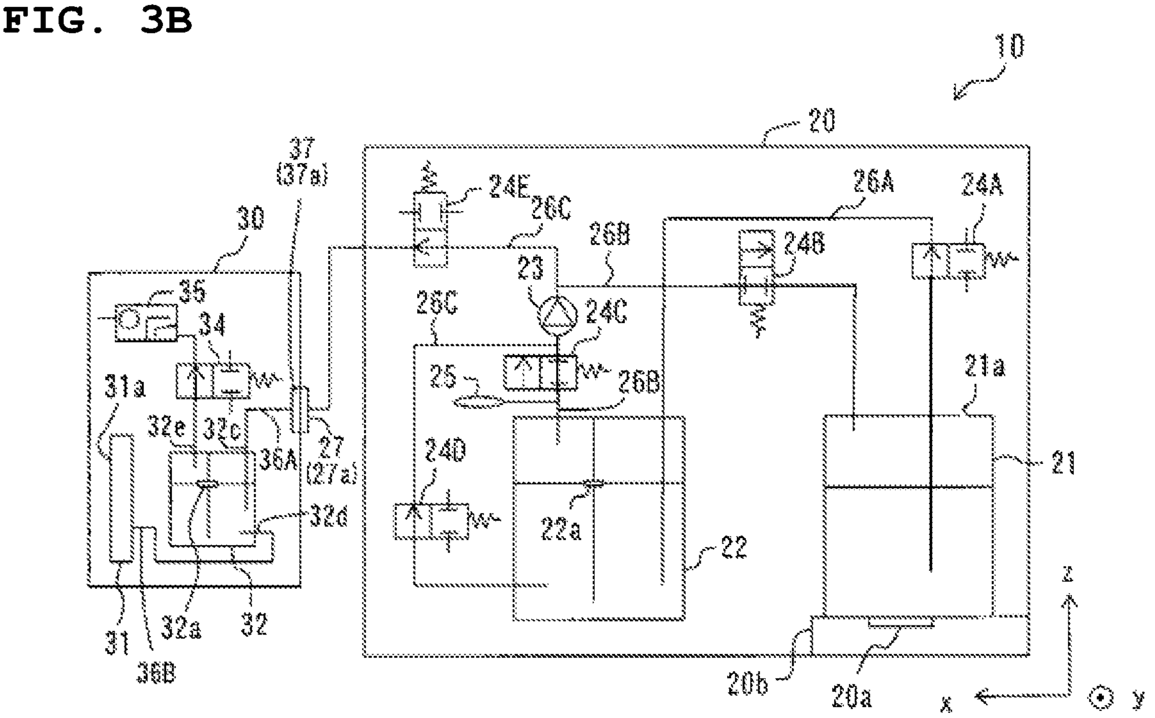
FIG. 3B is a schematic view depicting the ink supply system in the ink jet printer, and depicts an opened/closed state of each valve when ink is supplied from the second tank to a third tank.

When ink is supplied from the second tank 22 of the ink supply unit 20 to the third tank 32 of the head unit 30, the controller 50 drives the pump 23 in a state that the solenoid valves 24A, 24D, 24E are opened, and the solenoid valves 24B, 24C are closed, as depicted in FIG. 3B. Now, one end of the third channel 26C is disposed in a lower portion inside the second tank 22 at a position corresponding to the lower limit value of the ink amount in the second tank 22. Hence, if the pump 23 is driven in a state where the ink amount of ink inside the second tank 22 has not reached down to the lower limit value, then ink inside the second tank 22 will be supplied to the third tank 32 via the third channel 26C.

At this time, the inside of the second tank 22 attains a negative pressure, due to the ink inside the second tank 22 being sucked up. Moreover, the solenoid valve 24A is open, and the first tank 21 is provided with the atmosphere communicating hole 21*a*. As a result, ink is supplied from the first tank 21 to the second tank 22 via the first channel 26A. In other words, in the ink supply unit 20 of the present embodiment, by ink being supplied from the second tank 22 to the third tank 32, it is made possible for the second tank 22 to be replenished with ink from the first tank 21, without an operation for supplying ink to the third tank 32 being stopped.

Note that in the ink jet printer 10 of the present embodiment, when maintenance, and so on, of the head unit 30 is performed, the head unit 30 can be separated from the ink supply unit 20 by coupling of the first joint 27 and second joint 37 being released. At this time, as mentioned above, the valve 27*a* of the first joint 27 and valve 37*a* of the second joint 37 are closed. Now, let it be assumed, for example, that after completion of maintenance of the head unit 30, and in a state of the user having forgotten to couple the first joint 27 and second joint 37, the pump 23 has been driven to supply ink from the second tank 22 to the third tank 32. At this time, the valve 27*a* of the first joint 27 and solenoid valve 24B of the second channel 26B are closed. Now, if a pressure required to change the solenoid valve 24B from a closed state to an opened state (hereafter, called an opening/closing pressure) is larger than an opening/closing pressure of the valve 27*a*, then due to a rise in pressure of the third channel 26C and a portion between the pump 23 and solenoid valve 24B of the second channel 26B, the valve 27*a* will open earlier than the solenoid valve 24B, and ink will end up flowing out from the first joint 27. Accordingly, in the present embodiment, the opening/closing pressure of the solenoid valve 24B is configured smaller than the opening/closing pressures of not only the valve 27*a*, but also the other solenoid valves 24A, 24C, 24D, 24E. Therefore, in the above-mentioned kind of situation, the solenoid valve 24B will open earlier than the valve 27*a* and ink will return to the first tank 21, even if pressures of the third channel 26C and the portion between the pump 23 and solenoid valve 24B of the second channel 26B have risen. As a result, ink can be prevented from flowing out from the first joint 27.

Figure 3C:
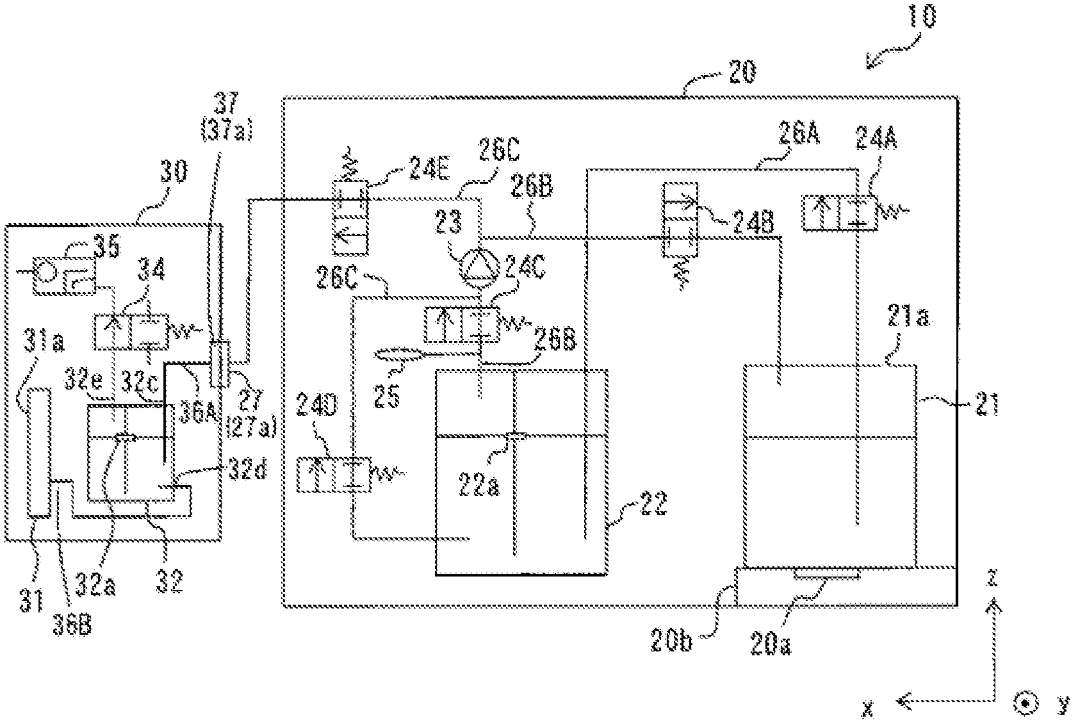
FIG. 3C is a schematic view depicting the ink supply system in the ink jet printer, and depicts an opened/closed state of each valve when an ink jet head is being driven.

Moreover, in the case that subsequent to ink having been supplied to the third tank 32, printing is performed by ink being discharged from the ink jet head 31, the controller 50 drives the ink jet head 31 in a state that all of the solenoid valves 24A-24E of the ink supply unit 20 are closed, and the solenoid valve 34 of the head unit 30 is opened, as depicted in FIG. 3C. At this time, the third tank 32 is communicating with the atmosphere via the solenoid valve 34 and labyrinth 35, so when ink is discharged from the ink jet head 31, substantially the same amount of ink as has been discharged is supplied from the third tank 32 to the ink jet head 31.

Note that when ink in the third tank 32 has become scarce in the course of printing being performed, the controller 50 controls the ink supply unit 20 so that there will be a change from the state depicted in FIG. 3C to the state depicted in FIG. 3B. In detail, the controller 50 drives the pump 23 having opened the solenoid valves 24A, 24D, 24E that had been in a closed state, but with the solenoid valves 24B, 24C left closed. Note that when ink in the third tank 32 has become scarce, a signal indicating that ink in the third tank 32 has become less than a certain amount is outputted from the float sensor 32*a* to the controller 50. As a result, even when ink in the third tank 32 has become less than the certain amount during printing, the third tank 32 can be replenished with ink from the second tank 22 without printing being stopped. Moreover, the second tank 22 is furthermore replenished with ink from the first tank 21. Hence, even if ink in the first tank 21 has run out during printing, the first tank 21 can be exchanged without printing being stopped.

Moreover, as mentioned above, subsequent to ink having been supplied to the third tank 32, in the case that printing is performed by ink being discharged from the ink jet head

Figure 3D:
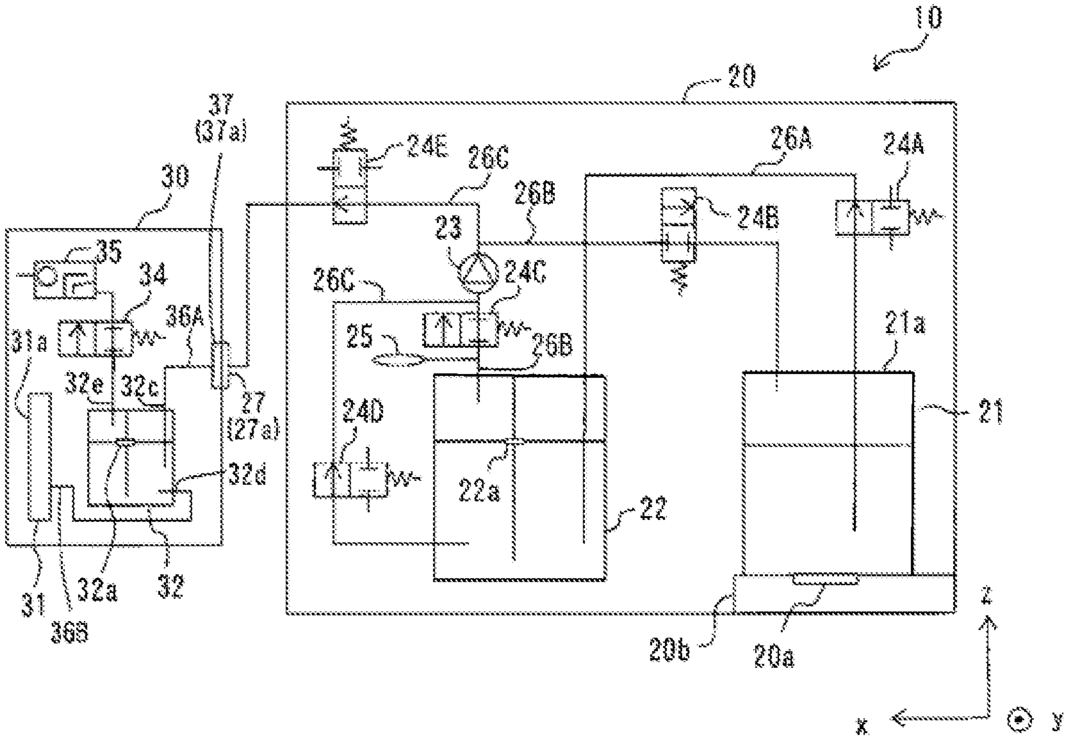
FIG. 3D is a schematic view depicting the ink supply system in the ink jet printer, and depicts an opened/closed state of each valve when ink is forcibly supplied from the third tank to the ink jet head.
Figure 3E:
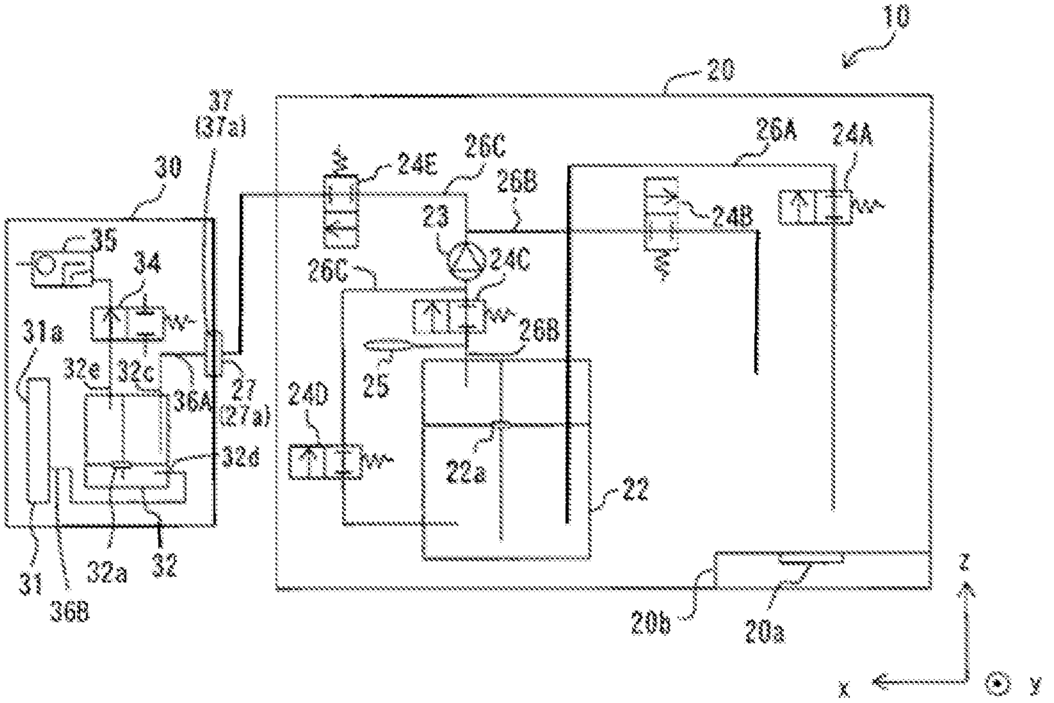
FIG. 3E is a schematic view depicting the ink supply system in the ink jet printer, and depicts an opened/closed state of each valve when the first tank has been removed from the ink supply unit during drive of the ink jet head.

31, all of the solenoid valves 24A-24E of the ink supply unit 20 are closed. Hence, in the present embodiment, as depicted in FIG. 3E, in the course of printing being performed by ink being discharged from the ink jet head 31, the first tank 21 can be exchanged by being removed from the ink supply unit 20. Now, it is conceivable that sometimes, in a period when the first tank 21 is removed from the ink supply unit 20, ink in the third tank 32 will become scarce, and there will arise a need for ink to be moved from the second tank 22 to the third tank 32. In this case, it is conceivable that in a state that the first tank 21 is removed from the ink supply unit 20, the solenoid valves 24A, 24D, 24E that had been in a closed state will be opened and the pump 23 subsequently driven, as mentioned above. However, if the solenoid valve 24A is opened before the pump 23 is driven, then a pressure balance within the first channel 26A will be destroyed, and ink that has been left in the first channel 26A will flow out from an end portion on an opposite side to the second tank 22. Due to the first tank 21 being removed at this time, the inside of the ink supply unit 20 will end up being dirtied by the ink that has flowed out.

Accordingly, in the present embodiment, in the case that, there has arisen a need for the third tank 32 to be replenished with ink from the second tank 22 in a period when the first tank 21 is removed from the ink supply unit 20, the controller 50 opens the closed-state solenoid valves 24A, 24D, 24E after there has elapsed a predetermined time (for example, about 0.5 seconds) from the pump 23 being driven. Since the pump 23 is first driven, the ink that has been left in the first channel 26A moves along the inside of the first channel 26A toward the second tank 22 after the solenoid valve 24A has been opened. As a result, it can be prevented that the ink left in the first channel 26A flows out to the opposite side to the second tank 22 and dirties the inside of the ink supply unit 20. Note that the controller 50 can detect there being a state of the first tank 21 being removed from the ink supply unit 20, based on a signal outputted from the installation sensor 20*a*. Moreover, the controller 50 can determine there to be a need for ink to be moved from the second tank 22 to the third tank 32, based on a signal outputted from the float sensor 32*a* in the third tank 32.

Note that in the present embodiment, sometimes, in order to discharge ink that has thickened inside the ink jet head 31 or in order to discharge an air bubble that has got mixed in on the inside of the ink jet head 31 or in the fifth channel 36B, ink is forcibly supplied from the third tank 32 to the ink jet head 31. In this case, the controller 50 drives the pump 23 in a state that the solenoid valves 24A, 24D, and 24E of the ink supply unit 20 are opened and the solenoid valves 24B, 24C of the ink supply unit 20 and solenoid valve 34 of the head unit 30 are closed, as depicted in FIG. 3D. As a result, ink is supplied from the second tank 22 to the third tank 32. At this time, the solenoid valve 34 of the head unit 30 is closed, so the inside of the third tank 32 attains a positive pressure, and ink is forcibly supplied from the third tank 32 to the ink jet head 31 via the fifth channel 36B.

Now, in the present embodiment, the solenoid valve 34 of the head unit 30 is always open, apart from during maintenance of the ink jet head 31 when ink is forcibly supplied from the third tank 32 to the ink jet head 31 as mentioned above. In other words, the third tank 32 is communicating with the atmosphere via the solenoid valve 34 and labyrinth 35, apart from during maintenance of the ink jet head 31. Therefore, even if pressure within the third tank 32 has risen due to a change in temperature, or the like, that pressure can be released to the atmosphere. As a result, ink can be prevented from leaking from the ink jet head 31. Moreover, one side surface of the labyrinth 35 is covered by the damper film 35*e*. Therefore, even if pressure within the third tank 32 has risen while ink is being supplied from the second tank 22 to the third tank 32, the damper film 35*e* of the labyrinth 35 will deform to enable the pressure to be absorbed. As a result, ink can be prevented from leaking from the ink jet head 31.

Furthermore, when printing is not performed, the head unit 30 is conceivably sometimes placed upside down. In this case, there is a possibility that, due to the solenoid valve 34 being open, ink within the third tank 32 will flow into the labyrinth 35 via the solenoid valve 34. However, due to the labyrinth 35 having a complexly intertwining channel formed on its inside and due to channel resistance being high too, the ink that has flowed into the labyrinth 35 can be prevented from leaking from the outflow port 35*c* of the labyrinth 35.

Moreover, as mentioned above, the solenoid valve 34 is closed during maintenance of the ink jet head 31. Hence, during maintenance of the ink jet head 31, a reduction of pressure within the third tank 32 can be prevented, and ink can be efficiently supplied from the third tank 32 to the ink jet head 31.

In the present embodiment, the ink jet head 31, which is fixed to a frame of the head unit 30, is used in an attitude of its ink discharging surface 31*a* being orthogonal to a horizontal plane. Now, when a direction that the ink discharging surface faces is defined as an x direction, a direction along the horizontal plane and orthogonal to the x direction is defined as a y direction, and a vertical direction is defined as a z direction, the head unit 30 of the present embodiment is sometimes used in a state of being inclined with respect to the z direction, when viewed in the x direction. In other words, the ink jet head 31 of the present embodiment is sometimes used in a state of being inclined with respect to the z direction, when viewed in the x direction. At this time, if the third tank 32 too ends up inclining with respect to the z direction, then there is a possibility that the float sensor 32*a* in the third tank 32 will not operate smoothly, and that the ink amount in the third tank 32 will be unable to be accurately grasped. In particular, the float sensor 32*a* is assumed to move in the vertical direction, so if, for example, a component in the horizontal direction is included in a direction of moving of the float, then a float of the float sensor 32*a* will sometimes not move as intended due to a frictional force in the horizontal direction. Accordingly, the head unit 30 of the present embodiment is configured so that, even when used in a state of being inclined with respect to the z direction when viewed in the x direction, the third tank 32 can be revolved and maintained in an attitude of a bottom surface of the third tank 32 being parallel to the horizontal plane.

Figure 6B:
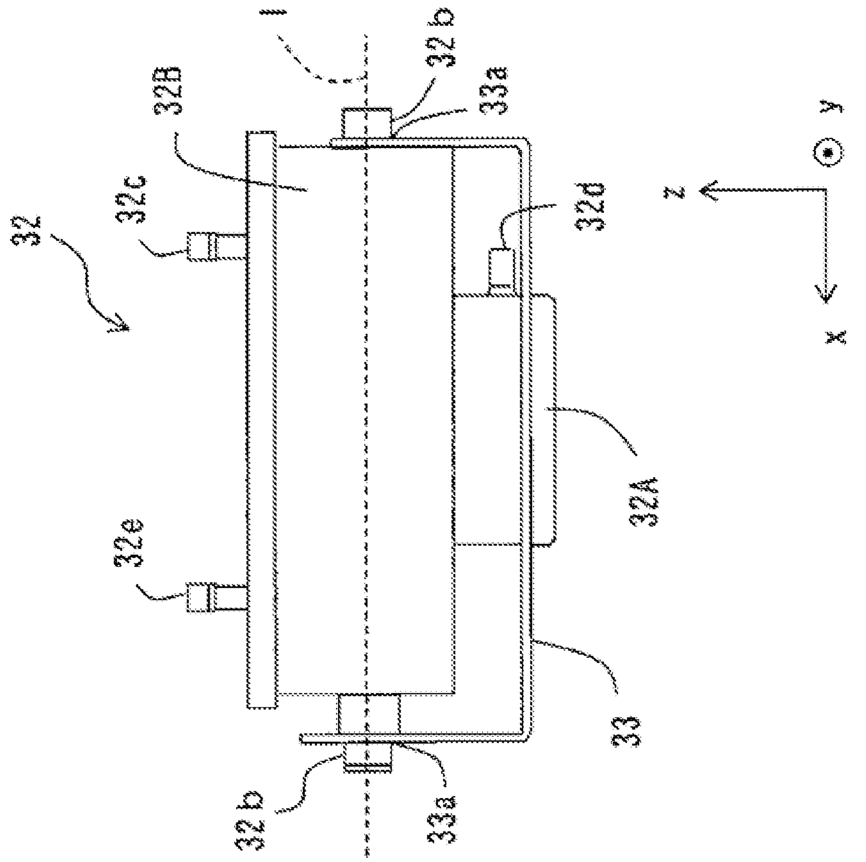
FIG. 6B is a diagram in which the third tank and the revolving mechanism provided in the head unit are viewed from a y direction.
Figure 6A:
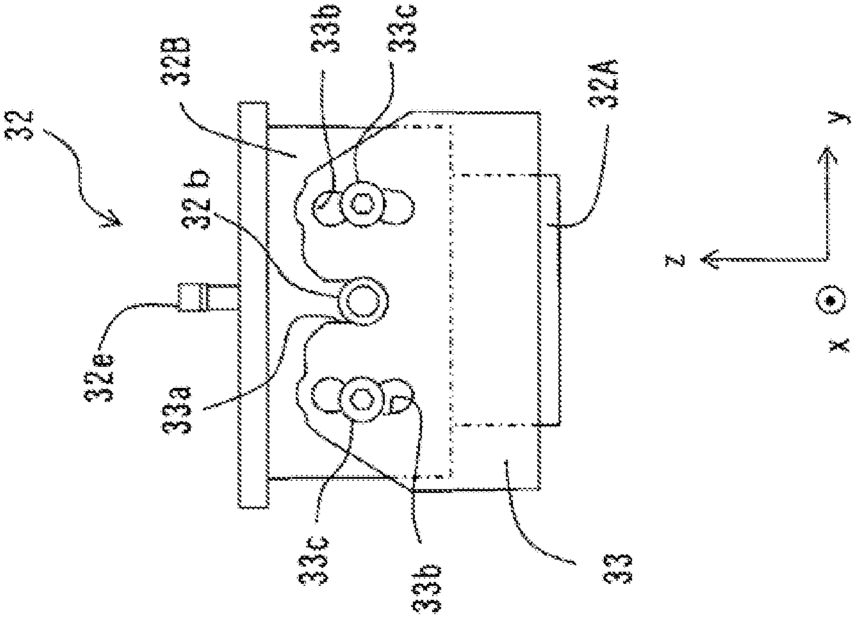
FIG. 6A is a diagram in which the third tank and a revolving mechanism provided in the head unit are viewed from an x direction.

Specifically, the head unit 30 comprises a revolving mechanism that lets the third tank 32 revolve around a revolving axis line I extending in the x direction. The revolving mechanism is configured from: a revolving shaft 32*b* that extends in the x direction; and a bearing 33*a* that supports the revolving shaft 32*b* in a manner enabling the revolving shaft 32*b* to revolve. In the present embodiment, the revolving shaft 32*b* is provided in the third tank 32, and the bearing 33*a* is provided in a third tank 32-dedicated holder 33 fixed to the head unit 30. The revolving shaft 32*b* is positioned more upwardly than a center position in the z direction of the third tank 32, in an attitude of the bottom surface of the third tank 32 being parallel to the horizontal plane. Note that, as depicted in FIG. 6A, the holder 33 has two long-holes 33*b* formed therein, and the two long-holes 33*b* each have a bolt 33*c* inserted therethrough. Moreover, even when the head unit 30 is used in a state of being inclined with respect to the vertical direction, the third tank 32 is fixed to the holder 33 by the bolts 33*c* in a state of the bottom surface of the third tank 32 having become parallel to the horizontal plane.

The third tank 32 is configured from: a first portion 32A including a bottom surface; and a second portion 32B including an upper surface and positioned above the first portion 32A, and a length in the y direction of the first portion 32A is shorter than a length in the y direction of the second portion 32B. Moreover, the first portion 32A has a length in the x direction which is longer than its length in the y direction, and the second portion 32B too has a length in the x direction which is longer than its length in the y direction. The first portion 32A has a first ink chamber formed therein, and the second portion 32B has a second ink chamber formed therein. The first ink chamber and the second ink chamber are communicating with each other, and volume of the first ink chamber is smaller than volume of the second ink chamber. Moreover, the float sensor 32*a* is positioned so as to be able to detect at least a position of a liquid surface of ink in the first ink chamber. The length in the x direction and length in the y direction of the first portion 32A are respectively shorter than the length in the x direction and length in the y direction of the second portion 32B, so the lower limit value of the ink amount detectable by the float sensor 32*a* can be made smaller compared to when the length in the x direction and length in the y direction of the first portion 32A are respectively the same as the length in the x direction and length in the y direction of the second portion 32B.

Furthermore, the third tank 32 has formed therein an inflow port 32*c*, an outflow port 32*d*, and an atmosphere communicating portion 32*e*. The inflow port 32*c* is connected with a tube forming the fourth channel 36A. The outflow port 32*d* is connected with a tube forming the fifth channel 36B. Moreover, the atmosphere communicating portion 32*e* is connected with a tube for connecting the third tank 32 and solenoid valve 34. As depicted in FIG. 6B, the inflow port 32*c* and the atmosphere communicating portion 32*e* are formed on the upper surface of the third tank 32. In contrast, the outflow port 32*d*, which is formed in the first portion 32A of the third tank 32, is positioned more upwardly than the bottom surface of the third tank 32. Moreover, the inflow port 32*c*, the outflow port 32*d*, and the atmosphere communicating portion 32*e* are each disposed so as to overlap the revolving axis line I when the third tank 32 is viewed from the z direction. As a result, it can be made less easy for the tubes connected to these inflow port 32*c*, outflow port 32*d*, and atmosphere communicating portion 32*e* to interfere with each other when the third tank 32 has revolved.

Moreover, an end portion of the atmosphere communicating portion 32*e* is positioned more downwardly than the upper surface of the second portion 32B. As a result, even if the third tank 32 has become upside down in such a case as when the head unit 30 has been placed upside down, an amount of ink flowing from the atmosphere communicating portion 32*e* into the labyrinth 35 via the solenoid valve can be suppressed.

In the above, the embodiment of the present disclosure is described. The present invention is not limited to the above-described embodiment, and may undergo a variety of design changes within a range described in the claims.

Figure 7:
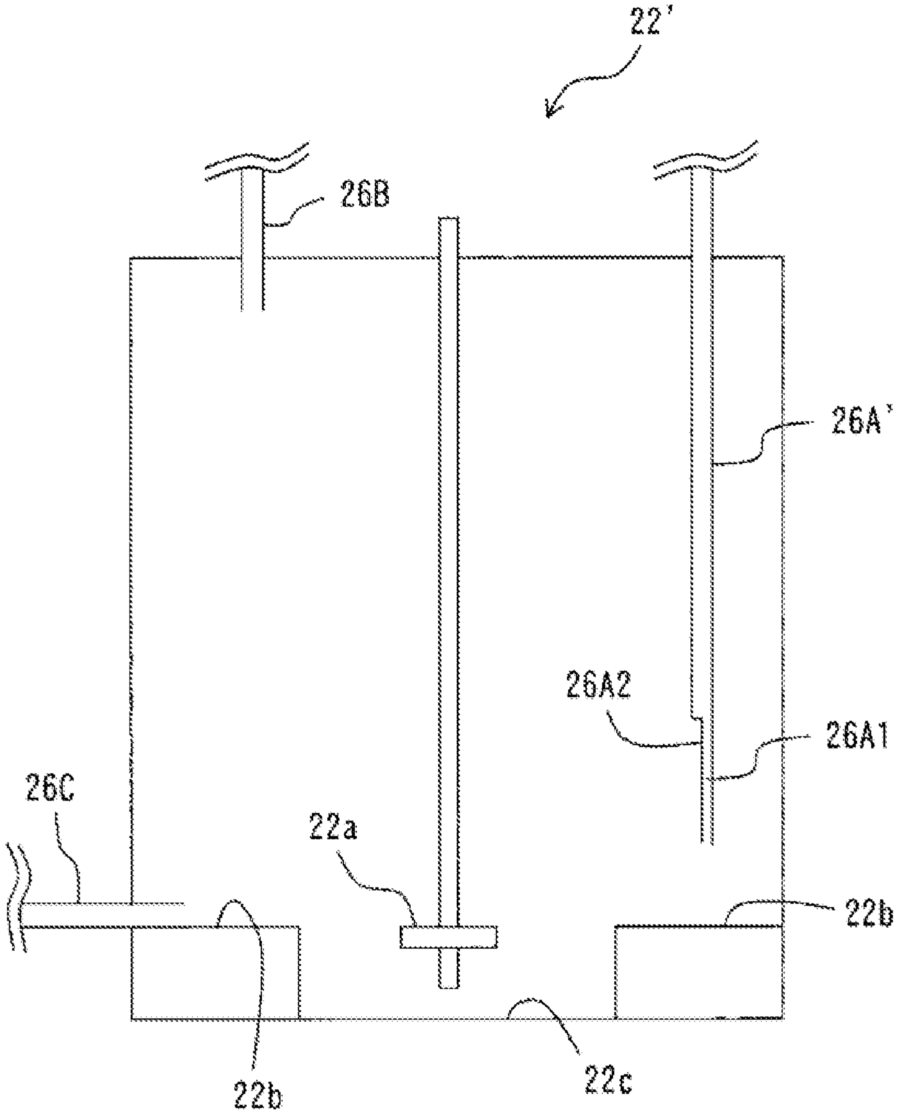
FIG. 7 is a schematic view explaining a first channel and a second tank.

For example, as depicted in FIG. 7, a second tank 22' may have: a first bottom surface 22*b*; and a second bottom surface 22*c* which is lower than the first bottom surface 22*b*, and an end portion of a first channel 26A' may be positioned directly above the first bottom surface 22*b*. In this case, it can be made less easy for a bubble to form when ink that has flowed out from the end portion of the first channel 26A' collides with the first bottom surface 22*b*, compared to when the end portion of the first channel 26A' is positioned directly above the second bottom surface 22*c*. As a result, a possibility of the float sensor 22*a* malfunctioning due to a bubble that has occurred in ink in the second tank 22', can be reduced.

Furthermore, as depicted in FIG. 7, by a cutout 26A2 being formed in a certain region 26A1 including the end portion of the first channel 26A', for example, channel resistance in the certain region 26A1 may be configured smaller than channel resistance in a region other than the certain region 26A1 in the first channel 26A'. In this case, it can be made even less easy for a bubble to form when ink that has flowed out from the end portion of the first channel 26A' collides with the first bottom surface 22*b*, compared to when channel resistance of the first channel 26A' is constant. As a result, a possibility of the float sensor 22*a* malfunctioning due to a bubble that has occurred in ink in the second tank 22', can be further reduced.

In the above-described embodiment, the atmosphere communicating portion 32*e* of the third tank 32 is formed on the upper surface of the third tank 32. However, there is no limitation thereto. For example, the atmosphere communicating portion 32*e* need only be formed at least more upwardly than the center position in the z direction of the third tank 32, in an attitude of the bottom surface of the third tank 32 being parallel to the horizontal plane.

In the above-described embodiment, the float sensor 22*a* and float sensor 32*a* are employed as sensors for detecting the ink amounts in the second tank 22 and third tank 32. However, there is no limitation thereto. For example, an optical type sensor including a light-projecting portion and a light-receiving portion may be employed as the sensors.

In the above-described embodiment, the revolving shaft 32*b* is provided on the third tank 32, and the bearing 33*a* is provided in the third tank 32-dedicated holder 33 of the head unit 30. However, a revolving shaft may be provided in the third tank 32-dedicated holder 33 of the head unit 30, and a bearing may be provided on the third tank 32.

According to one aspect of the present disclosure, there is provided an ink jet printer including:

- a first tank communicating with an atmosphere;
- a second tank;
- a head unit communicating with the second tank;
- a first channel having one end communicating with the first tank and the other end communicating with the second tank;
- a second channel having one end communicating with an upper part inside the second tank and the other end communicating with the first tank; and
- a pump which is disposed in the second channel and which is configured to move a fluid at least from the one end of the second channel to the other end of the second channel.

According to another aspect of the present disclosure, there is provided an ink jet printer further comprising:

- a first tank communicating with an atmosphere;
- a second tank;
- a head unit communicating with the second tank;
- a first channel having one end communicating with the first tank and the other end communicating with the second tank;

a second channel having one end communicating with an upper part inside the second tank and the other end communicating with the first tank;

a pump disposed in the second channel;

a sensor configured to output a first signal in a case that a position of a liquid surface of an ink in the second tank is lower than a first position and output a second signal in a case that the position of the liquid surface of the ink in the second tank is higher than a second position above the first position; and a controller electrically connected to the sensor and the pump, wherein the controller is configured to, in a case that the first signal is outputted from the sensor, drive the pump so that air in the second tank is moved into the first tank via the second channel, and consequently the ink in the first tank is moved into the second tank via the first channel, and in a case that the position of the liquid surface of the ink in the second tank is higher than the second position but the second signal is not outputted from the sensor, the pump is configured to move the ink in the second tank into the first tank via the second channel.

According to another aspect of the present disclosure, there is provided a method of supplying ink in an ink jet printer, the ink jet printer including: a first tank communicating with an atmosphere; a second tank different from the first tank; a head unit communicating with the second tank; a first channel having one end communicating with the first tank and the other end communicating with the second tank; a second channel having one end communicating with an upper part inside the second tank and the other end communicating with the first tank; a pump which is disposed in the second channel; and a sensor configured to output a first signal in a case that a position of a liquid surface of an ink in the second tank is lower than a first position and output a second signal in a case that the position of the liquid surface of the ink in the second tank is higher than a second position higher than the first position, the method including, in a case that the first signal is outputted from the sensor, moving the ink in the first tank to the second tank via the first channel by driving the pump so as to move air in the second tank into the first tank via the second channel, wherein in a case that the position of the liquid surface of the ink in the second tank is higher than the second position but the second signal is not outputted from the sensor, the driving of the pump is not stopped so that the ink in the second tank is moved into the first tank via the second channel.

What is claimed is:

1. An ink jet printer comprising:

an installation case in which a first tank communicating with an atmosphere is to be installed;

a second tank having a sensor configured to output a signal in response to a position of a liquid surface of ink in the second tank, the sensor outputs a first signal in a case that the liquid surface of the ink is detected by the sensor to be below a lower fill position and a second signal in a case that the liquid surface of the ink is detected by the sensor to be at an upper fill position;

a head communicating with the second tank, where the second tank and the first tank are upstream of the head;

a first channel having one end to be communicated with the first tank installed in the installation case and a second end communicating with the second tank;

a second channel having one end communicating with an upper part inside the second tank and a second end to be communicated with the first tank installed in the installation case, where the one end of the second channel is positioned at the upper fill position;

a pump which is disposed in the second channel; and a controller electrically connected to the pump and the sensor, and configured to control the pump to move air or ink at least from the one end of the second channel to the second end of the second channel in response to receipt of the first signal from the sensor until a receipt of the second signal, whereby ink is moved from the first tank to the second tank via the first channel, wherein the air is moved in a case that the liquid surface of the ink is below the lower fill position and the ink is moved in a case that the liquid surface of the ink is at the upper fill position, whereby the ink is returned to the first tank; and wherein the controller is configured to stop controlling the pump to move the air or ink at least from the one end of the second channel to the second end of the second channel in response to receipt of the second signal from the sensor which stops movement of the ink from the first tank to the second tank via the first channel.

2. The ink jet printer according to claim 1, wherein the controller is configured to drive the pump such that:

air in the second tank is moved into the first tank installed in the installation case via the second channel, until a position of the liquid surface of the ink in the second tank reaches up to the upper fill position; and the ink in the second tank is moved into the first tank installed in the installation case via the second channel, in a case that the position of the liquid surface of the ink in the second tank has reached up to the upper fill position.

3. The ink jet printer according to claim 2, further comprising:

a first portion of a third channel having one end communicating with a lower part inside the second tank and a second end connected to the second channel at a position between the one end of the second channel and the pump;

a second portion of the third channel having one end connected to the second channel at a position between the pump and the second end of the second channel and a second end communicating with the head;

a first valve disposed in the second channel at a position between the one end of the second channel and the pump; and a second valve disposed in the first portion of the third channel, wherein:

the controller is electrically connected to the first valve and the second valve, and the controller is configured to:

close the first valve and open the second valve; and then, drive the pump in a state that the first valve is closed and the second valve is opened such that the ink in the second tank is moved into the head via the first portion of the third channel, a portion of the second channel between a first connection and a second connection, and the second portion of the third channel, the first portion of the third channel being connected to the second channel at the first connection, the second portion of the third channel being connected to the second channel at the second connection.

4. The ink jet printer according to claim 3, further comprising:

a third valve disposed in the second channel at a position between the second end of the second channel and the second connection; and a joint which is disposed at the second end of the second portion of the third channel and which has a valve, wherein an opening/closing pressure of the third valve is smaller than each of an opening/closing pressure of the first valve, an opening/closing pressure of the second valve, and an opening/closing pressure of the joint.

5. The ink jet printer according to claim 3, further comprising:

a third valve disposed in the second channel at a position between the second end of the second channel and the second connection;

a fourth valve disposed in the first channel at a position between the one end of the first channel and the second end of the first channel;

a fifth valve disposed in the second portion of the third channel; and an installation sensor configured to output a signal depending on an installation state of the first tank with respect to the installation case, wherein the controller is electrically connected to the third valve, the fourth valve, the fifth valve, and the installation sensor, and, the controller is configured to:

close at least the third valve and the fourth valve after a signal indicating that the first tank is removed from the installation case has been outputted from the installation sensor;

then, drive the pump for a predetermined time in a state that at least the third valve and the fourth valve are closed;

then, close the first valve and open the second valve, the fourth valve, and the fifth valve, after driving the pump for the predetermined time; and then, drive the pump in a state that the first valve is closed and the second valve, the fourth valve, and the fifth valve are opened such that the ink in the second tank is moved into the head via the first portion of the third channel, the portion of the second channel between the first connection and the second connection, and the second portion of the third channel.

6. The ink jet printer according to claim 1, wherein a channel resistance of the first channel at a certain region including the second end of the first channel is smaller than a channel resistance of the first channel at a region different from the certain region.

7. The ink jet printer according to claim 6, wherein a cutout is formed in the certain region.

8. The ink jet printer according to claim 6, wherein the controller is configured to drive and stop the pump, depending on the signal outputted from the sensor.

9. The ink jet printer according to claim 6, wherein the second tank has a first bottom surface and a second bottom surface positioned lower than the first bottom surface, and the second end of the first channel is positioned directly above the first bottom surface.

10. The ink jet printer according to claim 1, wherein the sensor is configured to output the first signal in response to the position of the liquid surface of the ink in the second tank being lower than the lower fill position and output the second signal in response to the position of the liquid surface of the ink in the second tank being at the upper fill position above the lower fill position; and the controller is configured to:

in response to the first signal being outputted from the sensor, drive the pump so that air in the second tank is moved into the first tank installed in the installation case via the second channel, and consequently the ink in the first tank installed in the installation case is moved into the second tank via the first channel, and in response to the position of the liquid surface of the ink in the second tank being higher than the upper fill position but the second signal being not outputted from the sensor, drive the pump so that the ink in the second tank is moved into the first tank installed in the installation case via the second channel.

11. The ink jet printer according to claim 10, further comprising:

a first portion of a third channel having one end communicating with a lower part inside the second tank and a second end connected to the second channel at a position between the one end of the second channel and the pump;

a second portion of the third channel having one end connected to the second channel at a position between the pump and the second end of the second channel and a second end communicating with the head;

a first valve disposed in the second channel at a position between the one end of the second channel and the pump;

a second valve disposed in the first portion of the third channel;

a third valve disposed in the second channel at a position between the second end of the second channel and a second connection, the second portion of the third channel being connected to the second channel at the second connection;

a fourth valve disposed in the first channel at a position between the one end of the first channel and the second end of the first channel;

a fifth valve disposed in the second portion of the third channel; and an installation sensor configured to output a signal depending on an installation state of the first tank with respect to the installation case, wherein:

the controller is electrically connected to the first valve, the second valve, the third valve, the fourth valve, and the fifth valve, and, the controller is configured to:

after a signal indicating that the first tank is removed from the installation case has been outputted from the installation sensor, but before a signal indicating that the first tank is fitted to the installation case is outputted from the installation sensor, drive the pump in a state that the first valve, the second valve, the third valve, the fourth valve, and the fifth valve are closed, and, then, after driving the pump, open the second valve, the fourth valve, and the fifth valve, so that the ink in the second tank is moved into the head via the first portion of the third channel, a portion of the second channel between a first connection and the second connection, and the second portion of the third channel, the first portion of the third channel being connected to the second channel at the first connection.

12. A method of supplying ink in the ink jet printer as defined in claim 1, the method comprising:

outputting the first signal in a case that the position of the liquid surface of the ink in the second tank detected by the sensor is below the lower fill position;

outputting the second signal in a case that the position of the liquid surface of the ink in the second tank detected by the sensor is at the upper fill position higher than the lower fill position, in response to the first signal being outputted from the sensor, controlling the pump so as to move air in the second tank into the first tank installed in the installation case via the second channel, whereby ink is moved from the first tank to the second tank via the first channel, in response to the second signal being output from the sensor, controlling the pump to stop which stops movement of the ink from the first tank to the second tank via the first channel, wherein in response to the position of the liquid surface of the ink in the second tank being at the upper fill position, but the outputting of the second signal from the sensor does not occur, the pump is not stopped by the controlling so that the ink in the second tank is moved into the first tank installed in the installation case via the second channel whereby the ink is returned to the first tank.

* * * * *